P. A. FRIMAND.
UDDER ATTACHMENT FOR MILKING MACHINES.
APPLICATION FILED DEC. 20, 1915.
1,348,401.
Patented Aug. 3, 1920.
2 SHEETS—SHEET 1.
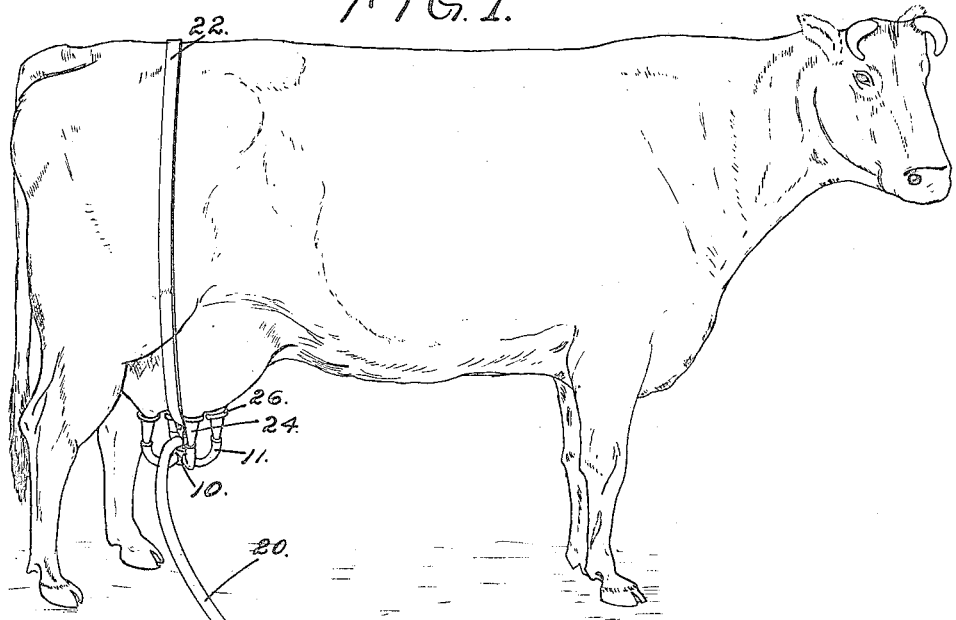
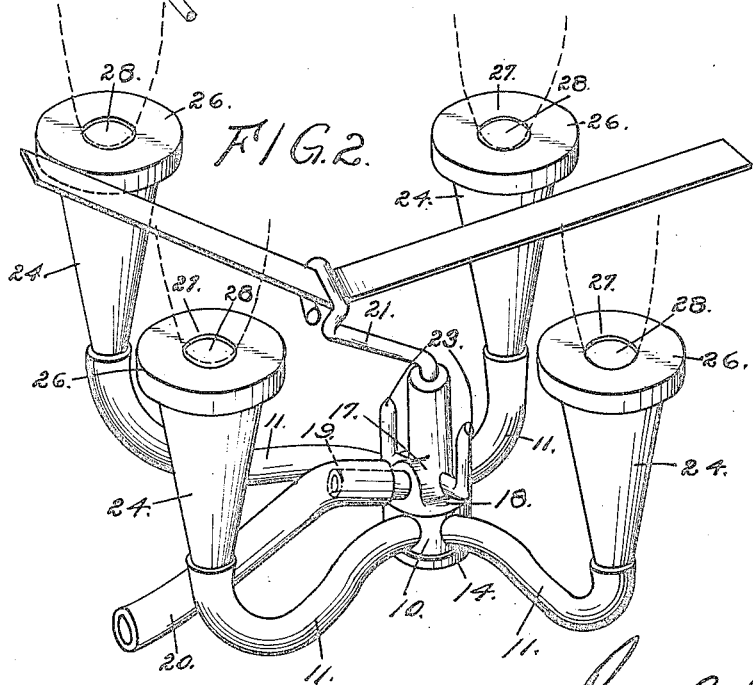

P. A. FRIMAND.
UDDER ATTACHMENT FOR MILKING MACHINES.
APPLICATION FILED DEC. 20, 1915.
1,348,401.
Patented Aug. 3, 1920.
2 SHEETS—SHEET 2.
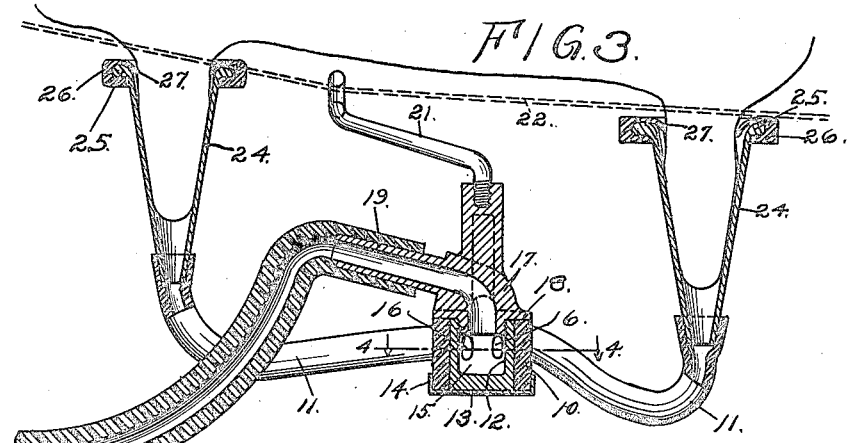
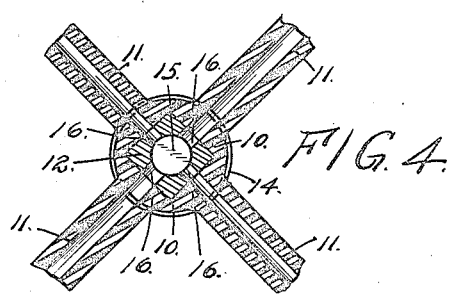
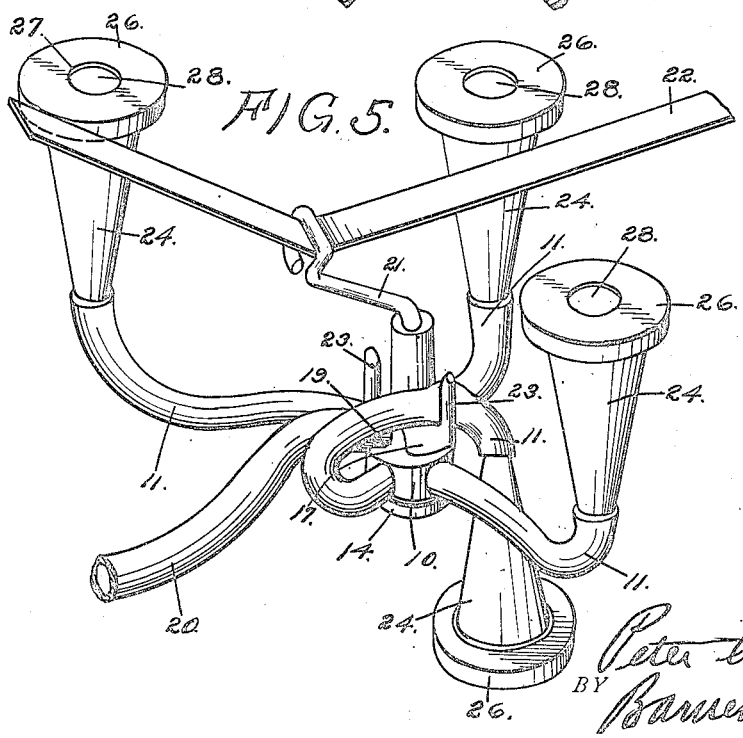

UNITED STATES PATENT OFFICE.

PETER A. FRIMAND, OF WILMETTE, ILLINOIS, ASSIGNOR TO THE BURTON PAGE COMPANY, OF CHICAGO, ILLINOIS, A CORPORATION OF ILLINOIS.

UDDER ATTACHMENT FOR MILKING-MACHINES.

1,348,401. Specification of Letters Patent. Patented Aug. 3, 1920.

Application filed December 20, 1915. Serial No. 67,800.

*To all whom it may concern:*

Be it known that I, PETER A. FRIMAND, a citizen of the United States, residing at Wilmette, in the county of Cook and State of Illinois, have invented certain new and useful Improvements in Udder Attachments for Milking-Machines, of which the following is a specification.

My invention relates to milking machines of the vacuum type, and more particularly to the part of the apparatus which is attached to the udder of the cow. This part of the milking machine, considered as a whole, will be designated herein, for convenience and references, as the udder attachment.

One of the objects of the invention is to construct this portion of the milking machine so that the application of the teat cups to the udder will be facilitated and the cups maintained in their proper operative positions without danger of accidental displacement due to the movement of the animal or other disturbing causes.

A further object is to provide an udder attachment for a milking machine which will readily adapt itself to any irregularities in the length or relative position of the teats of the cow.

A further object of the invention is to so construct and arrange the parts of such an attachment that they may be conveniently and thoroughly cleaned. This is an important consideration for sanitary reasons.

The invention consists in the constructions, arrangements and devices, to be hereinafter described and claimed, for carrying out the above stated objects and such other objects as will be mentioned in the following specification.

The invention is illustrated, in a preferred embodiment, in the accompanying drawings wherein—

Figure 1 shows the attachment as applied to the udder of a cow.

Fig. 2 is a view, in perspective, of the attachment as a whole with the teat cup tubes flexed for application to the teats of the animal, the latter being indicated by the dotted lines.

Fig. 3 is a sectional elevation of the attachment.

Fig. 4 is a sectional plan on line 4—4 of Fig. 3, and

Fig. 5 is a view, similar to Fig. 2 but showing one of the teat cup connections out of service with its tube closed.

Like characters of reference designate like parts in the several figures of the drawings.

Referring to the drawings, the teat cups are attached to a manifold consisting of a central hub portion 10 and tubes 11, preferably in radial arrangement with respect to the hub, the tubes and hub forming preferably a single integral structure molded to this form. The hub has an opening extending therethrough, preferably square in cross section, into which is fitted a core 12 terminating at the bottom in a circular head 13 formed with an upstanding flange 14 which surrounds the lower portion of the hub. The core 12 is formed with a central opening 15 and with ports 16 connecting the central opening with the bores of tubes 11. 17 is a bonnet or cap which is threaded into the upper end of the core and is formed with a head 18 which bears against the top of the hub. The purpose of constructing the core and its bonnet in this manner is to prevent the possibility of the leakage of air between the core and the hub. The bonnet 17 is formed with a nipple 19 for the suction pipe 20. The bonnet is also provided with suitable supporting means, for example, it may be furnished with a hook 21 adapted to engage a surcingle 22 which extends over the back of the cow. Preferably the point of support of the hook 21 is out of line with the axis of the hub of the attachment on the side of the suction pipe nipple. In this way the tendency which the weight of the suction hose would otherwise have to throw the attachment out of balance is overcome.

One or more studs 23 are provided on the bonnet. In case one of the teat cup connections is not used the tube forming part of its connection may be pinched between one of the studs 23 and the body of the bonnet 17, as shown in Fig. 5, so as to close the tube.

The teat cups consist preferably of conical metallic cup bodies 24 formed at their upper ends with circumferential rims 25 over which are fitted rubber caps 26. The caps are formed with relatively thin diaphragms 27 having openings 28 therein to receive the teats of the cow.

Operation: The attachment above described is intended particularly for use in connection with a vacuum milking machine, such, for example, as that shown in my co-pending application Serial No. 56,294, filed October 16, 1915, in which the suction is produced by means of a hand pump. I do not wish to be understood, however, as intending to limit the utility of the attachment to a machine of this type.

However, in a milking machine in which the suction is produced by a hand pump, it is necessary to have the udder attachment of such character that it may be applied to the udder of the animal before the suction is created. In a machine in which the vacuum is produced by a power pump the teat cups will be drawn onto the teats of the animal by suction as soon as they are brought in contact therewith, but in a hand operated machine this method of application would require two men, one to pump and the other to put the teat cups in position. With the arrangement herein shown and described a single operator, before he starts pumping, can thrust the teats partially into the teat cups, as indicated in Fig. 2, and the teat cups will stay in this position until the suction draws them fully into the cups. This is possible because of the flexibility of the manifold throughout. There are no rigid connections, for example, between the tubes 11 and the hub 10. This allows the tubes to be flexed to the extent required without any clamping action which would tend to displace them when applied to the teats. This flexibility of the manifold, due to its integral construction, also allows the teat cups to adjust themselves to irregularities in the length of the teats or in their relative position.

The attachment is preferably supported on the surcingle 22 on a point at one side of the axis of the hub, that is, on the side over the suction pipe nipple so that the weight of the suction pipe, tending to draw the attachment down on one side, is balanced.

The parts of the attachment may be very readily cleaned. The teat cups are simply thrust into the ends of the tubes 11. Their rubber caps 26 can be quickly removed by simply slipping them from the ribs 25. The manifold can be cleaned by thrusting a brush or swab into one of each pair of alined tubes and through the hub into the other tube of the pair. If it is necessary to sterilize the metal core 12 this may be done by unscrewing the bonnet 17 and removing the core from the hub.

While I have described my invention as embodied in certain preferred constructions I do not wish to be understood as limiting the invention to the particulars shown and described except so far as the claims are specifically so limited.

I claim:

1. In an udder attachment for a milking machine, the combination of a teat cup manifold comprising a flexible rubber hub having flexible rubber tubes extending therefrom adapted to support teat cups at their outer ends in substantially vertical position when said cups are partially applied to the teats of a cow, and means for supporting said attachment in operative position.

2. In an udder attachment for a milking machine, the combination of a teat cup manifold comprising a flexible rubber hub formed with integral flexible rubber tubes extending therefrom adapted to support teat cups at their outer ends in substantially vertical position when said cups are partially applied to the teats of a cow, and means for supporting said attachment in operative position.

3. In an udder attachment for a milking machine, the combination of a teat cup manifold comprising a flexible rubber hub provided with relatively short flexible rubber tubes extending therefrom in radial arrangement and adapted to support teat cups at their outer ends in substantially vertical position when said cups are partially applied to the teats of a cow, and means for supporting said attachment in operative position.

4. In an udder attachment for a milking machine, a teat cup manifold comprising a rubber hub, and rubber teat cup tubes which extend from said hub, and a core fitted in said hub provided with a suction pipe nipple and with means for supporting said manifold on a surcingle, or the like.

5. In an udder attachment for a milking machine, a teat cup manifold comprising a rubber hub, rubber teat cup tubes which extend from said hub, a core fitted in said hub provided with a suction pipe nipple and with a supporting device, the point of support of which is out of line with the axis of the hub.

6. In an udder attachment for a milking machine, a teat cup manifold comprising a rubber hub, rubber teat cup tubes which extend from said hub, a core fitted in said hub provided with a suction pipe nipple and with a supporting device, the point of support of which is out of line with the axis of the hub on the side of said suction pipe nipple.

7. In an udder attachment for a milking machine, a teat cup manifold comprising a rubber hub, rubber teat cup tubes which extend from said hub, and a core fitted in said hub formed at the bottom with a head having an upstanding rim which surrounds the lower portion of said hub.

8. In an udder attachment for a milking machine, a teat cup manifold comprising a rubber hub, rubber teat cup tubes which extend from said hub, a core fitted in said hub, and a bonnet detachably engaged with said core and provided with a suction pipe nipple.

9. In an udder attachment for a milking machine, a teat cup manifold comprising a rubber hub, rubber teat cup tubes which extend from said hub, a core fitted in said hub, and a bonnet detachably engaged with said core and provided with a suction pipe nipple and with a supporting hook.

10. In an udder attachment for a milking machine, a teat cup manifold comprising a rubber hub, rubber teat cup tubes which extend from said hub, a core fitted in said hub, and a bonnet threaded into the upper end of the hub which is provided with a clamping flange bearing upon the upper end of the hub and with a suction pipe nipple.

11. In an udder attachment for a milking machine, a teat cup manifold comprising a rubber hub, rubber teat cup tubes which extend from said hub, a core fitted in said hub, and a bonnet threaded into the upper end of the hub which is provided with a clamping flange bearing upon the upper end of the hub, with a suction pipe nipple and with a supporting device.

12. In an udder attachment for a milking machine, a teat cup manifold comprising a rubber hub, rubber teat cup tubes which extend from said hub, a core fitted in said hub, and a bonnet threaded into the upper end of the hub which is provided with a clamping flange bearing upon the upper end of the hub, with a suction pipe nipple and with a supporting device, the point of support of which is out of line with the axis of the hub on the side of said nipple.

13. In an udder attachment for a milking machine, a teat cup manifold comprising a rubber hub and rubber tubes which extend from said hub, a core fitted into said hub, and a suction pipe nipple on said core.

14. In an udder attachment for a milking machine, a teat cup manifold comprising a rubber hub and rubber tubes extending from said hub, supporting means for said hub comprising a core fitted into the same, a suction pipe nipple on said supporting means, and a stud on said supporting means between which and the body of the supporting means one of said tubes may be pinched to close the same when out of service.

15. In an udder attachment for a milking machine, a teat cup manifold comprising a rubber hub and rubber teat cup tubes which extend from said hub, a core fitted into said hub, a bonnet threaded into the upper end of said core, a suction pipe nipple on said bonnet, and a stud between which and the bonnet one of said tubes may be pinched to close the same when out of service.

16. In an udder attachment for a milking machine, a teat cup manifold consisting of an integral rubber structure having a hub and teat cup tubes extending therefrom, a core fitted into said hub formed with a head having an upstanding rim which surrounds the lower portion of said hub, and a bonnet threaded into the upper end of the core formed with a flange which bears upon the door of the hub.

17. In an udder attachment for a milking machine, a teat cup manifold consisting of an integral rubber structure having a hub and teat cup tubes extending therefrom, a core fitted into said hub formed with a head having an upstanding rim which surrounds the lower portion of said hub, a bonnet threaded into the upper end of the core formed with a flange which bears upon the top of the hub, and a suction pipe nipple on said bonnet.

18. In an udder attachment for a milking machine, a teat cup manifold consisting of an integral rubber structure having a hub and teat cup tubes extending therefrom, a core fitted into said hub formed with a head having an upstanding rim which surrounds the lower portion of said hub, a bonnet threaded into the upper end of the core formed with a flange which bears upon the top of the hub, a suction pipe nipple on said bonnet, and a hook on said bonnet, the supporting point of which is out of line with the axis of the hub on the side of said nipple.

19. In an udder attachment for a milking machine, a teat cup manifold consisting of an integral rubber structure having a hub and teat cup tubes extending therefrom, a core fitted into said hub formed with a head having an upstanding rim which surrounds the lower portion of said hub, a bonnet threaded into the upper end of the core formed with a flange which bears upon the top of the hub, a suction pipe nipple on said bonnet, a hook on said bonnet, the supporting point of which is out of line with the axis of the hub on the side of said nipple, and a stud on said bonnet between which and the body portion of the bonnet one of said tubes may be pinched to close the same.

20. In an udder attachment for a milking machine, the combination of a teat cup manifold having a hub and radially arranged teat cup tubes, and supporting means for the manifold provided with a suction pipe nipple, the point of support of which is out of line with the axis of said hub on the side of said suction pipe nipple.

21. In an udder attachment for a milking machine, the combination of a plurality of teat cup tubes connected together at their inner ends and forming a single integral rubber structure adapted to support teat cups at the outer ends of said tubes in substantially vertical position when said cups are partially applied to the teats of a cow, and means for supporting said tubes in operative position.

22. In an udder attachment for a milking machine, a plurality of teat cup tubes connected together at their inner ends and forming a single integral rubber structure, in combination with a metallic core arranged at the intersection of said tubes, provided with means for attaching thereto a suction pipe, and with a supporting device.

23. In an udder attachment for a milking machine, the combination of a teat cup manifold comprising a plurality of teat cup tubes provided with cups, and a hollow element to which they are connected; and means on said manifold for holding one of said tubes, when its cup is not in use, in a cramped position to close the same.

24. In an udder attachment for a milking machine, the combination of a teat cup manifold comprising a plurality of teat cup tubes provided with cups and a hollow element to which they are connected, means on said manifold for holding one of said tubes, when its cup is not in use, in a cramped position to close the same, and means for supporting said attachment in operative position.

PETER A. FRIMAND.